(12) United States Patent
Angst et al.

(10) Patent No.: US 9,273,800 B2
(45) Date of Patent: Mar. 1, 2016

(54) VALVE

(71) Applicant: VAT Holding AG, Haag (CH)

(72) Inventors: Christoph Angst, Eichberg (CH); Rico Rohner, Widnau (CH)

(73) Assignee: VAT Holding AG, Haag (CH)

( * ) Notice: Subject to any disclaimer, the term of this patent is extended or adjusted under 35 U.S.C. 154(b) by 248 days.

(21) Appl. No.: 13/969,647

(22) Filed: Aug. 19, 2013

(65) Prior Publication Data

US 2014/0048736 A1 Feb. 20, 2014

(30) Foreign Application Priority Data

Aug. 17, 2012 (AT) .................................. A 898/2012

(51) Int. Cl.
*F16K 51/02* (2006.01)
*F16K 3/18* (2006.01)

(52) U.S. Cl.
CPC ................. *F16K 51/02* (2013.01); *F16K 3/188* (2013.01)

(58) Field of Classification Search
CPC ....... F16K 51/02; F16K 3/184; F16K 3/3165; F16K 3/316; F16K 3/188; F16K 3/0254; F16K 3/0272; F16K 3/029; F16K 3/186
USPC ......... 251/326–327, 195–197, 199, 229, 291, 251/366–367, 62
See application file for complete search history.

(56) References Cited

U.S. PATENT DOCUMENTS

| 4,129,328 | A | 12/1978 | Littell |
| 7,762,527 | B2 | 7/2010 | Schoen et al. |
| 2004/0079915 | A1 | 4/2004 | Contin et al. |

FOREIGN PATENT DOCUMENTS

| DE | 102007030006 | 2/2008 |
| WO | 2011096613 | 8/2011 |
| WO | 2011137691 | 11/2011 |

*Primary Examiner* — Marina Tietjen
(74) *Attorney, Agent, or Firm* — Volpe and Koenig, P.C.

(57) ABSTRACT

A valve (1), in particular a vacuum valve, comprising a valve plate (2) for closing an opening (3), in particular of the valve (1), and comprising at least two piston cylinder units (4, 5) for pressing the valve plate (2) against a valve seat (6), in particular of the valve (1), said valve seat surrounding the opening (3), at least one of the piston cylinder units (5) having at least one cylinder (7) as a component and at least one piston (8) arranged displaceably in the cylinder (7) as a further component, one of the components of the piston cylinder unit (5) being fixed on the valve plate (2), in particular in a manner stationary relative to the valve plate (2), wherein at least one of the components, preferably the other component, of this piston cylinder unit (5) is mounted on at least one support (10, 11) of the valve (1) so as to be movable, preferably displaceable, at least in a direction (9) parallel to the spacing between two adjacent piston cylinders units (4, 5). (FIG 7)

18 Claims, 6 Drawing Sheets

VALVE

INCORPORATION BY REFERENCE

The following documents are incorporated herein by reference as if fully set forth: Austrian Patent Application A898/2012, filed Aug. 17, 2012.

BACKGROUND

The present invention relates to a valve, in particular a vacuum valve, comprising a valve plate for closing an opening, in particular of the valve, and comprising at least two piston cylinder units for pressing the valve plate against a valve seat, in particular of the valve, said valve seat surrounding the opening, at least one of the piston cylinder units having at least one cylinder as a component and at least one piston arranged displaceably in the cylinder as a further component, one of the components of the piston cylinder unit being fixed on the valve plate, in particular in a manner stationary relative to the valve plate.

A generic vacuum valve is known for example from US 2004/0079915 A1.

SUMMARY

The object of the invention is to provide an improvement of a generic valve such that this valve can then also be used particularly when the valve plate is exposed to large temperature fluctuations.

This is achieved in accordance with the invention by mounting at least one of the components, preferably the other component, of this piston cylinder unit on at least one support of the valve so as to be movable, preferably displaceable, at least in a direction parallel to the spacing between two adjacent piston cylinder units.

A basic concept of the invention is therefore to arrange a first component of at least one piston cylinder unit on the valve plate in a fixed or stationary manner and to mount a component of this piston cylinder unit, preferably the other component of this piston cylinder unit, on at least one support so as to be movable, preferably displaceable. It is thus possible for the spacing in particular between adjacent piston cylinder units to change when the valve plate expands or contracts due to temperature. Due to the movable or displaceable mounting of the at least one component of the piston cylinder unit on the support, stresses caused by the temperature-induced expansion or contraction of the valve plate are avoided. In particular, for the purpose of providing an optimal seal, there are no deformations of the valve plate in the plane in which it bears against the valve seat. The component of the piston cylinder unit that is mounted displaceably on the at least one support can be both the cylinder and also the piston of this piston cylinder unit. The respective other component is then fixed on the valve plate. Here, this is preferably a stationary fixing of this component on the valve plate. This means that this component of the piston cylinder unit fixed on the valve plate forcibly follows the valve plate in the event of a thermally induced expansion or contraction thereof. The other component must be movable or displaceable along the support or the supports at least in a direction parallel to the spacing between two adjacent piston cylinder units.

The valve plate is preferably designed or provided with seals such that it is suitable under the prevailing pressure conditions for sealing the opening fully in the event of closing. Here, the valve plate and its seals are designed in accordance with the intended pressure ranges and the required contact pressures.

The opening to be closed by means of the valve plate is preferably a component of the valve and also the valve seat surrounding said opening. Embodiments of the invention in which the valve seat and opening have to be ascribed to another component part are also conceivable however.

The support or supports is/are preferably tubes or rods, at least in some regions. For the purpose of stable mounting alone, at least one of the components of this piston cylinder unit is preferably mounted on two or more supports so as to be movable, preferably displaceable, at least in a direction parallel to the spacing between two adjacent piston cylinder units.

In preferred embodiments of the invention, the supports are additionally also used as line systems for introducing and/or draining gaseous or liquid medium, in particular pressurized medium, into or out from working chambers of the cylinder. For the purpose of this double function, at least one connection line for a gaseous or liquid medium, preferably a pressurized medium, is thus preferably arranged in or on the support or at least one of the supports, said connecting line leading to a working chamber of the cylinder of at least one of the piston cylinder units.

The cylinder of at least one of the piston cylinder units preferably has two working chambers which are arranged on mutually opposed sides of the piston and can be filled with gaseous or liquid medium, preferably a pressurized medium. In this case, one of the working chambers is preferably vented into the atmosphere and the other working chamber can preferably be filled with gaseous or liquid pressurized medium in order to press the valve plate against the valve seat. The term "pressurized medium" means that the gaseous or liquid medium in this working chamber and the feed lines and discharge lines thereof is only at atmospheric pressure or normal air pressure. The working chamber is then opened with respect to the atmosphere via the feed lines and/or discharge lines, such that, when the piston is displaced in the cylinder, the air from this working chamber can flow out into the atmosphere. In preferred exemplary embodiments, the other working chamber is then used to close the valve and, where appropriate, also to open the valve by filling gaseous or liquid medium as pressurized medium into this working chamber or by removing said medium again from this working chamber. For the purpose of providing a restoring option, in these embodiments at least one return spring for lifting the valve plate from the valve seat can also be arranged in the working chamber vented with respect to the atmosphere.

In accordance with particularly preferred embodiments of the invention, the support or the supports is/are fastened on at least one, preferably centrally arranged, piston cylinder unit and the respective other component of at least one, preferably all, of the other piston cylinder units is/are mounted on the support or the supports so as to be movable, preferably displaceable at least in a direction parallel to the spacing between two adjacent piston cylinder units. In other words, the support or the supports is/are preferably fixed on a preferably centrally arranged piston cylinder unit. The components of the other piston cylinder units mounted movably on the supports can then slide along accordingly on the support or the supports in the event of corresponding thermally induced expansions or contractions of the valve plate. In particular in these embodiments, the feed line and/or discharge line of the gaseous or liquid media or pressurized media may also be provided centrally above the piston cylinder unit on which the support or the supports is/are fastened. In this regard, gaseous or liquid medium, preferably pressurized medium, can preferably be supplied to the working chamber or the working chambers of the other piston cylinder unit or piston cylinder units and/or gaseous or liquid medium, preferably pressurized medium, can preferably be released from the working chamber or the working chambers of the other piston cylinder unit or piston cylinder units via the piston cylinder unit on which the support or the supports is/are fastened and via the support or the supports.

In accordance with preferred embodiments of the invention, so that the pressure built up by the piston cylinder units in order to press the valve against the valve seat can also be used fully for this purpose, at least one countersupport member of the valve is arranged on the piston cylinder units and, when the valve plate is pressed against the valve seat by means of the piston cylinder units, can be supported on a counterseat, preferably of the valve. These countersupport members may even also be further valve plates or the like, which are then likewise used to close an opening with a corresponding counter valve seat, where appropriate in a sealed manner.

The valve plate is preferably pressed against the valve seat by means of the piston cylinder units in a closing direction, and the valve plate is movable by means of a transverse drive in a second direction deviating from the closing direction and preferably arranged orthogonal thereto. Such valves are known per se as "L-valves", in which the valve plate, in order to close the opening, can be moved by means of the transverse drive from a release position into an intermediate position, in which it already covers the opening but is not pressed thereagainst in a sealing manner. In a second step of the closing process, the valve plate is then pressed in the closing direction by means of the piston cylinder units against the valve seat surrounding the opening and therefore generally seals the opening. The opening process is carried out in reverse accordingly. All electric, pneumatic, hydraulic or other drives known per se in the prior art can be used as a transverse drive. The valve plate preferably also moves linearly between the fully opened, release position and the aforementioned intermediate position, similarly to the movement of the valve plate in the closing direction by means of the piston cylinder units. It is also conceivable however for the valve plate to be pivoted by means of the transverse drive from the fully opened release position into the aforementioned intermediate position.

In accordance with particularly preferred embodiments of the invention, the transverse drive is also displaced in the closing direction when the valve plate is pressed against the valve seat, as is known per se from DE 10 2007 030 006 A1.

In the embodiments of the invention in which the connection lines from and to the working chambers of the cylinder are arranged in or on the support or supports, the other component of the piston cylinder unit, preferably the cylinder, is preferably connected via a slot-hole combination or slot-slot combination to the connection lines in the support or supports. As a result, it is ensured that the possibility of an overflow of the gaseous or liquid medium or pressurized medium from the connection line into the working chamber of the cylinder and vice versa is not interrupted by displacement of this component or cylinder along the support or the supports. The corresponding region in which the hole-slot combination or slot-slot combination is arranged can be sealed outwardly by appropriate seals. In these variants, the slot may be located in the cylinder, and the hole or the other slot in the support, or vice versa.

For the sake of completeness, it is also noted that a vacuum valve is a valve that is used in "vacuum technology". The term vacuum technology is used when certain production processes, cleaning processes or other processes are carried out under "vacuum", that is to say under strong negative pressure. In this field of technology, vacuum valves are used to provide closable openings in process chambers. These valves can be used for the controlled admission and discharge of media, in particular gaseous media, but also for the introduction and removal of objects, such as the parts to be processed, into or out from the process chambers.

Within the scope of vacuum technology, reference is generally made to pressures less than 1 mbar (millibar) or 100 Pascal.

BRIEF DESCRIPTION OF THE DRAWINGS

Further features and details of a preferred exemplary embodiment are illustrated in the figures, in which.

DETAILED DESCRIPTION OF THE PREFERRED EMBODIMENTS

Figure 1:
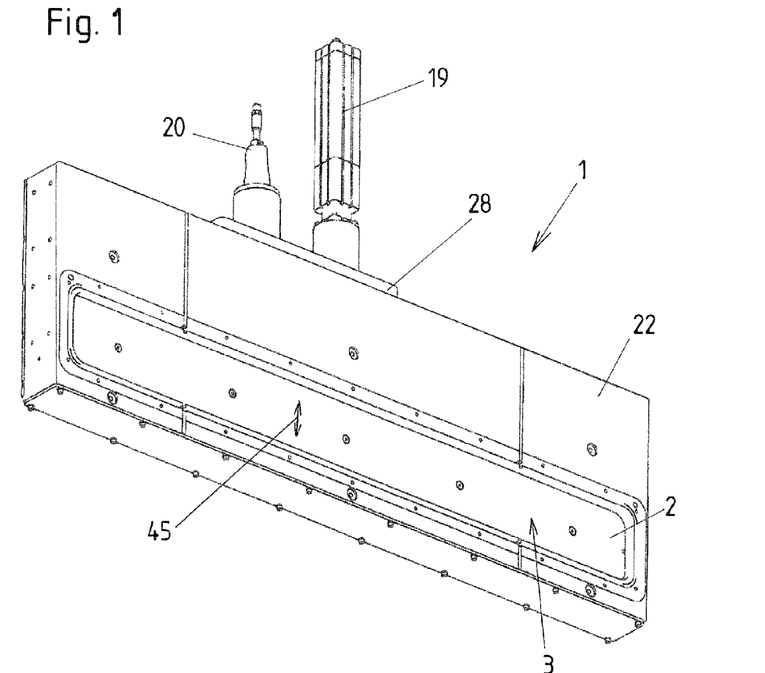
FIGS. 1 and 2 show perspective external views of a vacuum valve according to the invention.
Figure 2:
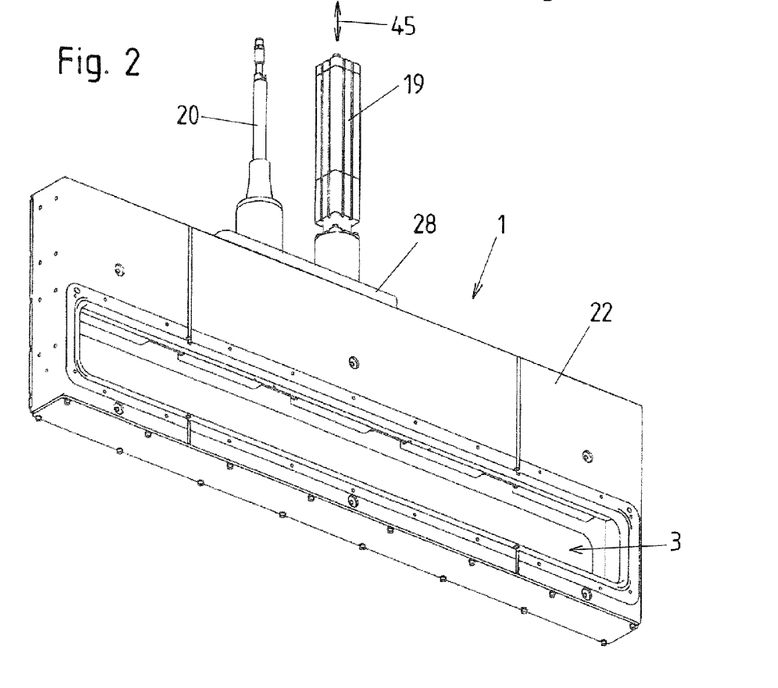

FIG. 1 shows a perspective illustration of the valve 1 according to the invention provided in the form of a vacuum valve, with an opening 3 closed by means of the valve plate 2. FIG. 2, in the same perspective illustration as FIG. 1, likewise shows the vacuum valve 1, the valve plate 2 being moved into its fully open, release position however, such that the opening 3 is fully opened. Of course, in other exemplary embodiments, the valve plate 2 in its maximum release position may also only release the opening 3 in part. In the exemplary embodiment shown, the opening 3 and the valve seat 6 surrounding said opening are housed in the valve housing 22, such that they are thus part of the valve 1. The transverse drive 19 and the media connection 20 are also arranged on the valve housing 22 via the drive support plate 28. The transverse drive 19 is used to move the valve plate 2 in the transverse drive directions 45 between an intermediate position, in which it covers the opening 3 but is not yet pressed against the valve seat 6, and the fully opened release position according to FIG. 2. The transverse drive 19 may be any linear drives known per se. These may be pneumatic or hydraulic piston cylinder units, electric linear drives, rack-and-pinion gears, etc. As already mentioned in the introduction, the transverse drive 19 may also be designed to carry out pivoting movements of the valve plate 2 between the release position and intermediate position. The media connection 20 is basically used as a connection for the feed line and discharge line of gaseous or liquid medium or pressurized medium to/from the piston cylinder units 4 and 5, as is shown more clearly with reference to FIGS. 3 and 4, following hereinafter.

Figure 3:
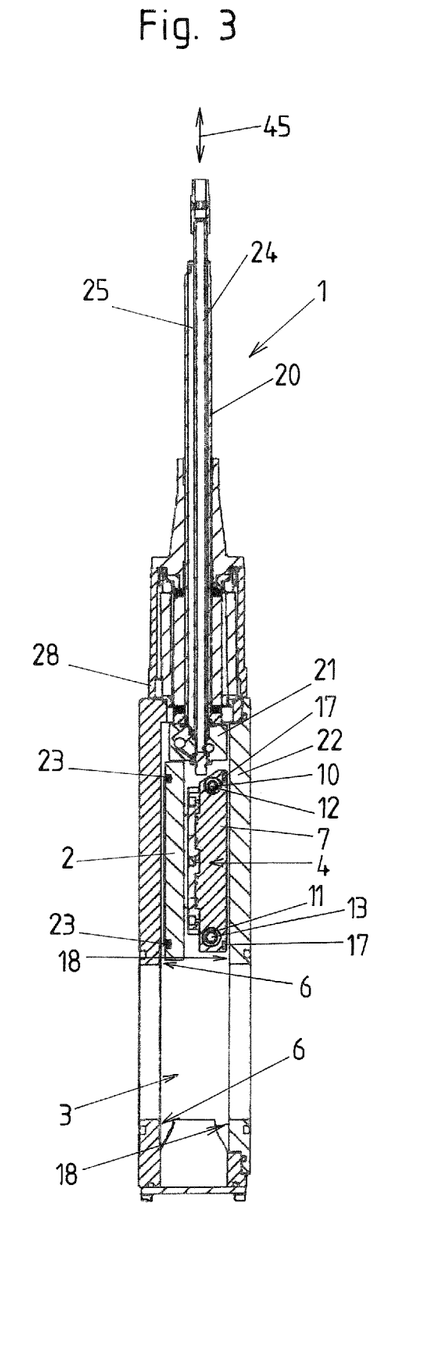
FIGS. 3 and 4 show vertical sections through this vacuum valve in the region of the media connection.
Figure 4:
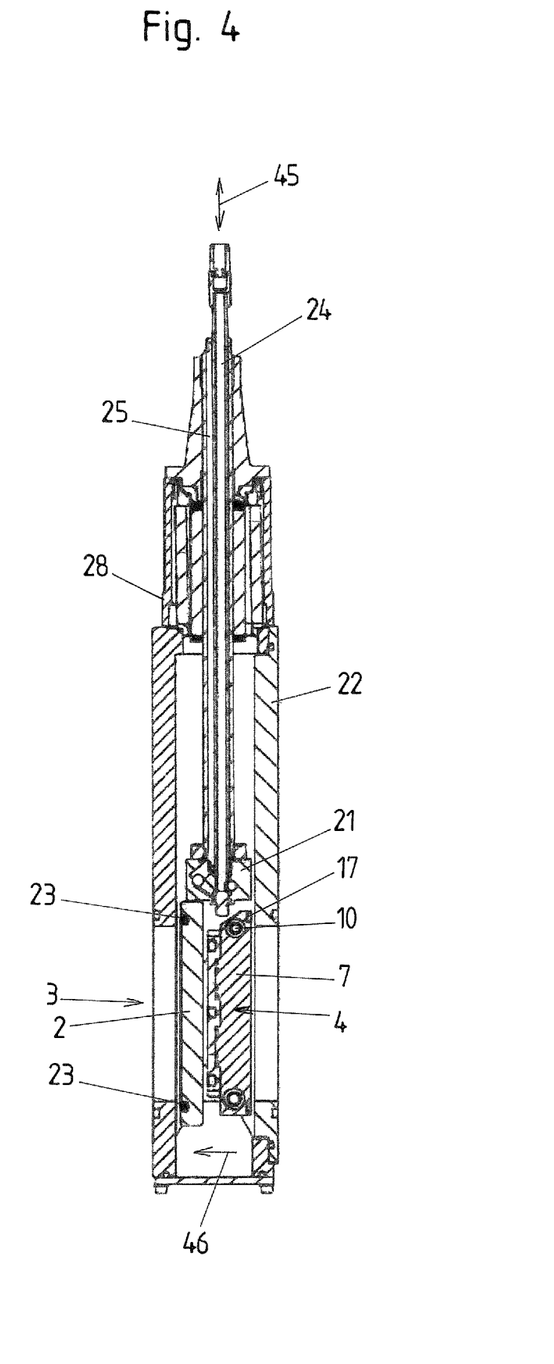

FIGS. 3 and 4 each show a vertical section through the vacuum valve 1 in the region of the media connection 20.

In the exemplary embodiment shown, the piston cylinder units 4 and 5 are piston cylinder units that are acted on pneumatically, more specifically with air, and press the valve plate 2 from the aforementioned intermediate position in the closing direction 46 into the closed position against the valve seat 6. The invention can of course however also be implemented with hydraulic, that is to say liquid-actuated, piston cylinder units 4 and 5. The pressure line 24 of the media connection 20 is used to apply pressure to the working chambers 14 of the piston cylinder units 4 and 5 by means of a suitable pressure source, the pressure chambers being explained in greater detail further below. Furthermore, the pressure from the working chambers 14 is also discharged again via the pressure line 24. The working chambers 15 of the piston cylinder units 4 and 5 are directly connected to the atmosphere via the atmosphere line 25 of the media connection 20. The working chambers 15 are thus permanently at atmospheric pressure, that is to say normal air pressure.

The pressure line 24 is connected via a suitable distributor block 21 and the central piston cylinder unit 4 to the connection line 12 running in the support 10, said connection line leading via the slot 30 hole 35 combinations and the connection bores 37 to the working chambers 14 of the piston cylinder units 5. The atmosphere line 25 is connected via the distributor block 21 and the central piston cylinder unit 4 to the connection line 13 running in the support 11, said connection line opening out via the slot 31 hole 36 connections and the connection bores 38 into the working chambers 15 of the piston cylinder units 5, in which the return springs 16 are also arranged. The exact course of these pressure or media connections can be easily understood with reference to the figures yet to be explained hereinafter.

In FIGS. 3 and 4, it is in any case clearly visible how the valve plate 2 with its seal 23 and on its rear face the piston cylinder unit 4 with the supports 10 and 11 and the countersupport members 17 is arranged below the distributor block 21. In FIG. 3, the valve plate 2 is moved upwardly into the fully opened release position, such that the opening 3 in the valve housing 22 allows a free passage. By contrast, in FIG. 4 the valve plate 2 is lowered into its intermediate position, in which it covers the opening 3, but is not yet pressed with its seals 23 against the valve seat 6 in a sealing manner. In order to press the valve plate 2 against the valve seat 6 in a sealing manner starting from FIG. 4, pressure is applied to the working chambers 14 of the piston cylinder units 4 and 5, whereby the valve plate 2 is pressed via its seals 23 against the valve seat 6, and the cylinders 7 of the piston cylinder units 4 and 5 are pressed via their countersupport members 17 against the counterseats 18 of the valve housing 22. The valve plate 2 thus experiences a movement in the closing direction 46, which is orthogonal to the transverse drive direction 45 in the exemplary embodiment shown. The cylinders 7 of the piston cylinder units 4 and 5 are moved in the direction opposite the closing direction 46. On the whole, the valve plate 2 thus experiences an L-shaped movement between its closed position, in which it is pressed via the seals 23 against the valve seat 6, and the fully opened position according to FIG. 3, both in the event of the opening process and in the event of the closing process.

A particular feature of the exemplary embodiment shown here is that, when the valve plate 2 is pressed against the valve seat 6 and the cylinder 7 is pressed against the counterseat 18, the entire transverse drive unit, comprising the transverse drive 19, the drive rod 27 thereof and also the drive plate 28, and the media connection 20, are likewise also moved in a direction parallel to the closing direction 46. For the purpose of a good seal, this ensures that the valve plate 2 bears particularly effectively against the valve seat 6, since, due to the entrained movement of the aforementioned parts parallel to the closing direction 46, the valve plate 2 cannot tilt. In order to enable this entrained movement of the drive plate 28 and the component parts fastened thereto parallel to the closing direction 46, the linear guides 26, which are particularly clearly visible in FIGS. 5 and 6, are arranged on the drive plate 28 and allow a corresponding displacement of the drive plate 28 relative to the valve housing 22.

Figures 5, 6:
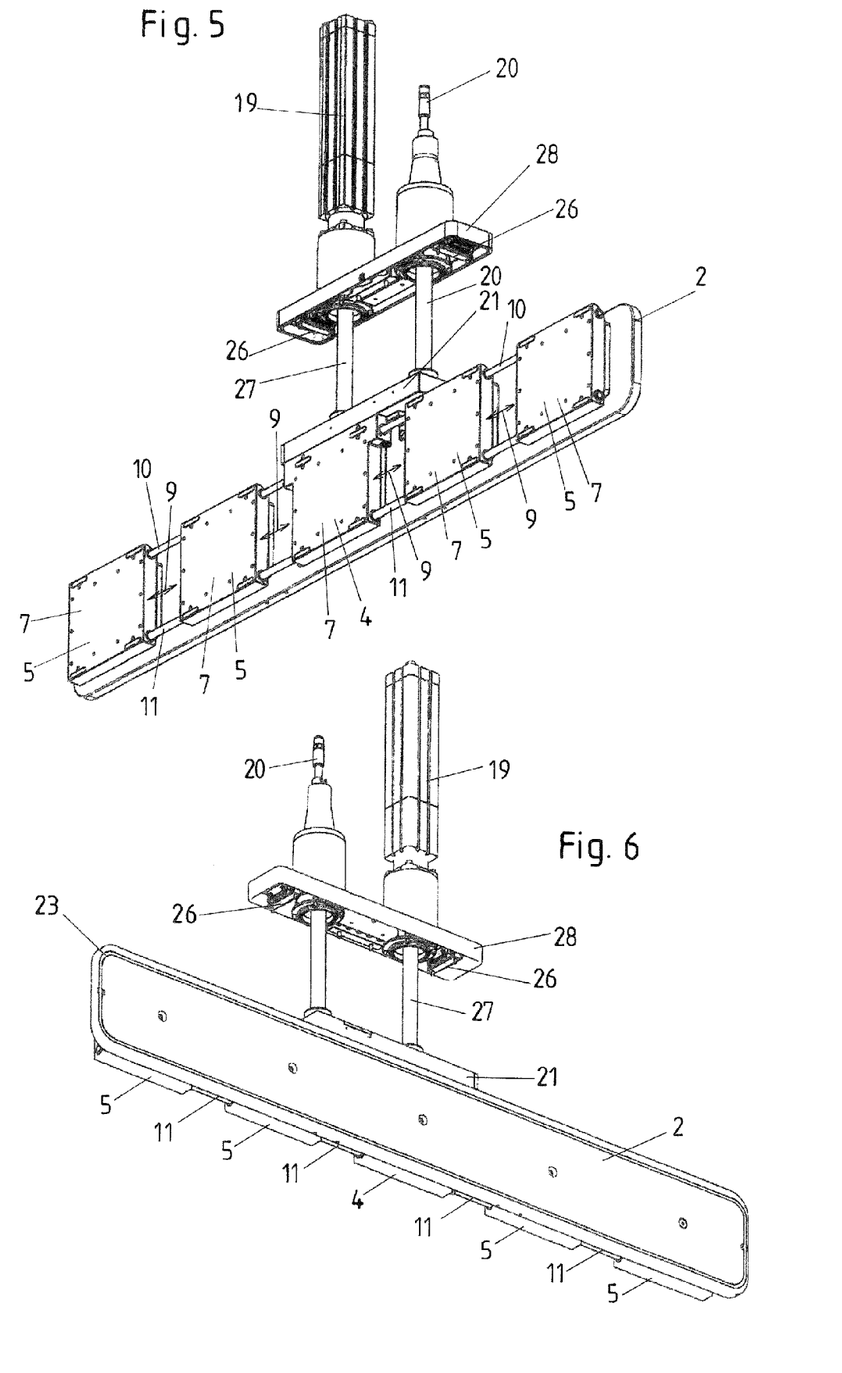
FIGS. 5 and 6 show perspective illustrations of this vacuum valve, the valve housing not being illustrated.

The valve housing 22 is not illustrated in FIGS. 5 and 6, such that the rest of the component parts of the valve 1 otherwise arranged in and on the valve housing 22 can be better seen. Besides the linear guides 26 already mentioned on the drive support plate 28, the arrangement of the central piston cylinder unit 4 and of the further piston cylinder units 5 placed therebeside and mounted displaceably on the supports 10 and 11 can also be seen particularly clearly. Due to the displaceable mounting of the cylinders 7 of the further piston cylinder units 5 on the supports 10 and 11, it is possible for the spacing in the directions 9 between said cylinders 7 and the respective adjacent piston cylinder unit 4 or 5 to change in the event of a temperature-induced lengthwise expansion or a temperature-induced contraction of the valve plate 2. In accordance with the invention, temperature-induced stresses or deformations at the valve plate 2 are thus avoided. In the exemplary embodiment shown, the supports 10 and 11 are formed as tubes. A connection line 12 or 13, which leads to one of the working chambers 14 or 15 respectively of the cylinders 7 of the piston cylinder units 5 runs in said tubes. The supports 10 and 11 are fastened on the centrally arranged piston cylinder unit 4.

Figure 7:
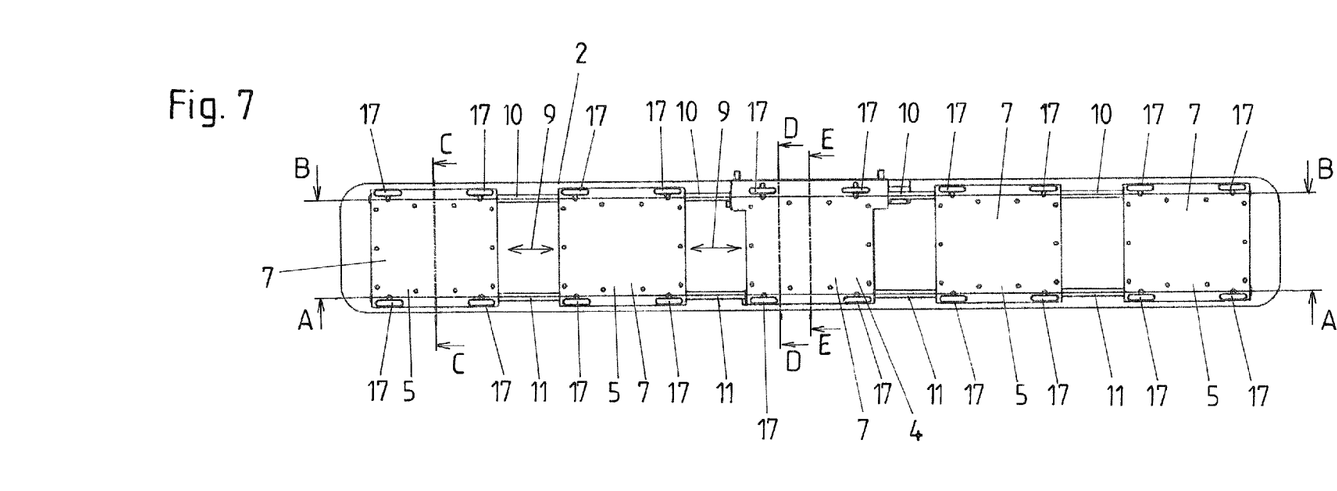
FIG. 7 shows a view from the rear of the valve plate, including piston cylinder units and supports.
Figure 8:
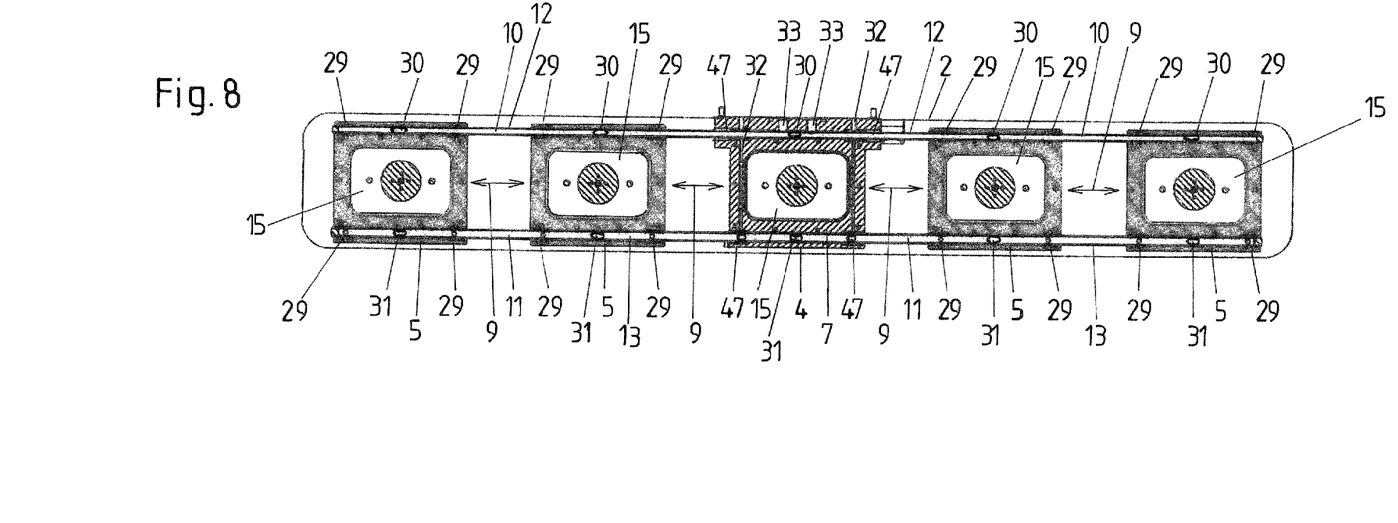
FIG. 8 shows a vertical section through the piston cylinder units of FIG. 7.

FIG. 7 shows a view from the rear of the valve plate 2 and also the piston cylinder units 4 and 5 arranged there. Here, the arrangement of the cylinders 7 on the supports 10 and 11 and also the countersupport members 17 arranged on the cylinders 7 can be seen particularly clearly. FIG. 8 shows a vertical section through the arrangement according to FIG. 7 in the region of the working chambers 15 of the cylinders 7 and of the supports 10 and 11. Here, the sliding seals 29, by means of which the cylinders 7 of the piston cylinder units 5 are mounted displaceably on the supports 10 and 11, can also be seen, at least schematically. These sliding seals 29 allow a displacement of these cylinders 7 in directions 9 on the supports 10 and 11 and seal the openings through which the supports 10 and 11 are guided by the cylinders 7, but also seal outwardly. In the central piston cylinder unit 4, the supports 10 and 11 are fixed on said cylinder 7 in a sealed manner via the fixing seals 47.

In the section according to FIG. 8, the slots 30 in the support 10 and the slots 31 in the support 11 can also be clearly seen. The slots 30 in the support 10 cooperate with the holes 35 in the cylinder 7 of the piston cylinder units 4 and 5. The slots 31 in the support 11 cooperate with the holes 36 in the respective cylinder 7 of the piston cylinder units 4 and 5. These slot 30 or 31 and hole 35 or 36 connections ensure that these overflow openings between the working chambers 14 and 15 of the piston cylinder units 5 and the connection lines 12 and 13 in the supports 10 and 11 are not closed in the event of temperature-induced displacement of the cylinders 7 on the supports 10 and 11.

In the section according to FIG. 8, the venting connection lines 32 and the pressure connection lines 33 can also be seen in the region of the cylinder 7 of the central piston cylinder unit 4. The pressure connection lines 33 constitute the connection between the pressure line 24 of the media connection 20 and the connection line 12 in the support 10. The venting connection lines 32 connect the connection line 13 in the support 11 to the atmosphere line 25 of the media connection 20. A suitable connection between the venting connection lines 32 and the pressure connection lines 33 on the one hand and between the pressure line 24 and the atmosphere line 25 on the other hand is provided by the distributor block 21 arranged therebetween.

Figure 9:
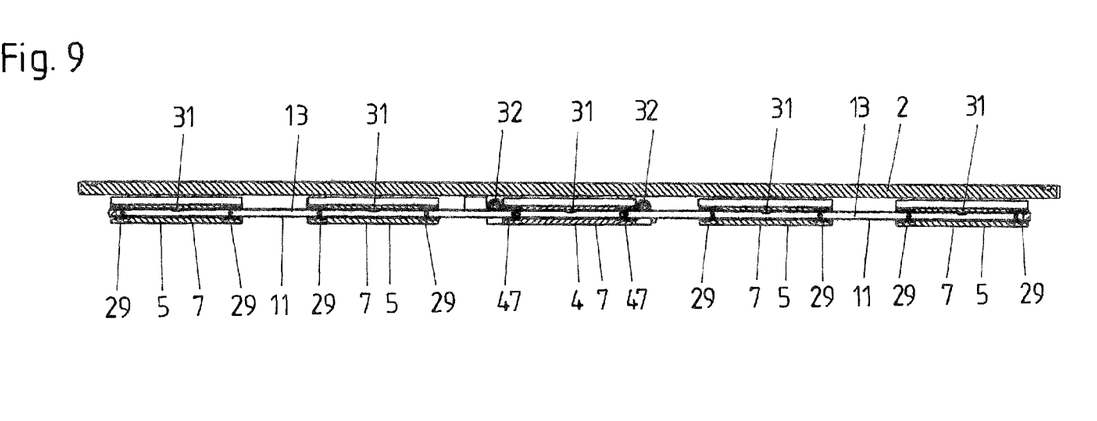
FIG. 9 shows a horizontal section along the line of section AA from FIG. 7.
Figure 10:
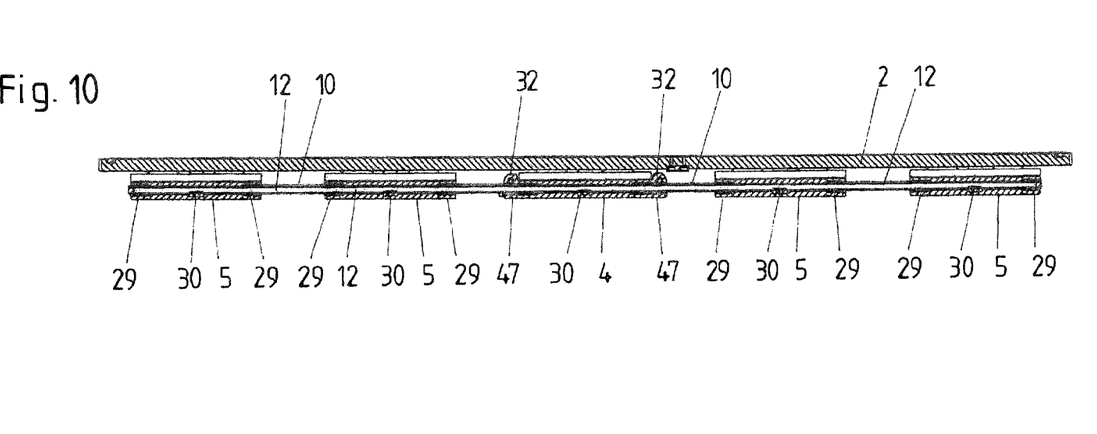
FIG. 10 shows a horizontal section along the line of section BB from FIG. 7.

FIG. 9 shows the section AA from FIG. 7 along the support 11. FIG. 10 shows the section along the support 10 along the line of section BB from FIG. 7.

Figure 11:
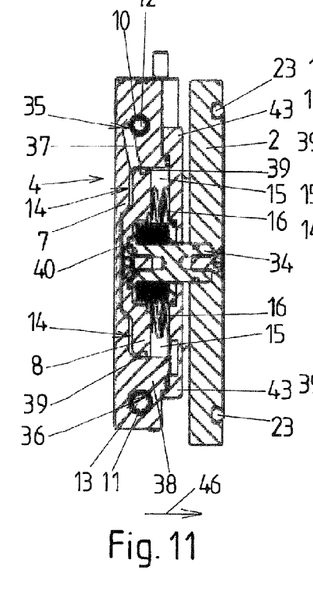
FIG. 11 shows a vertical section along the line of section EE from FIG. 7.

FIG. 11 now shows a vertical section through the piston cylinder unit 4 and the valve plate 2 arranged in front. The fixing of the piston 8 on the valve plate 2 by means of the fixing pin 34 can be clearly seen. This type of fixing ensures that the piston 8 of the piston cylinder unit 4 is arranged in a stationary manner relative to the valve plate 2. The piston 8 is mounted in the cylinder 7 so as to be displaceable in the directions parallel to the closing direction 46. Together with its piston seal 39, it separates the two working chambers 14 and 15 of the cylinder 7 from one another. Pressure is applied to the working chamber 14 in order to press the valve plate 2 against the valve seat 6 via the connection bores 37, the slot 30 hole 35 connection, and the connection line 12 arranged in the support 10. Here, the air at atmospheric pressure can then escape from the working chamber 15 via the connection bore 38 and the slot 31 hole 36 connection into the connection line 13 of the other support 11. The bellows 40 constitutes a seal between the working chamber 14 and the working chamber 15. The return springs 16 are also arranged in the working chamber 15 and provide a restoring effect, that is to say for a lifting of the valve plate 2 from the valve seat 6, when the pressure is discharged from the working chamber 14. If the pressurized medium is drawn from the working chamber 14 with a corresponding suction, these return springs 16 could also be omitted in principle.

Figure 12:
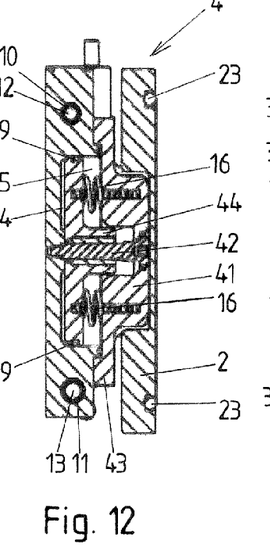
FIG. 12 shows a vertical section along the line of section DD from FIG. 7.

FIG. 12 shows a further section through the central piston cylinder unit 4 along a slightly offset line of section DD, as is shown in FIG. 7. In this region, the guide pins 44 are located, by means of which the piston 8 is guided linearly during its displacement movements in the cylinder 7. The section according to FIG. 12 also runs through one of the curvatures 41 in the cylinder cover 43, which can be seen particularly clearly in the exploded illustration according to FIG. 14 and ensure that the piston cylinder units 4 and 5 are aligned in a positionally accurate manner with the valve plate 2.

Figure 13:
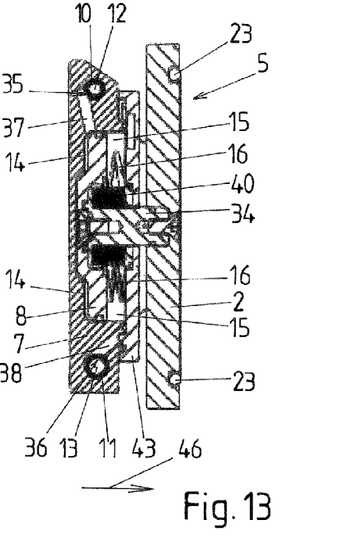
FIG. 13 shows a vertical section along the line of section CC from FIG. 7.

FIG. 13 shows a section through one of the piston cylinder units 5 mounted displaceably on the supports 10 and 11. The design corresponds substantially to the design of the central piston cylinder unit 4 explained with reference to FIG. 11. The main difference is the displaceable mounting of the piston cylinder unit 5 or the cylinders 7 thereof by means of the sliding seal 29 on the supports 10 and 11, which cannot be seen however in this sectional view according to FIG. 13.

Figure 14:
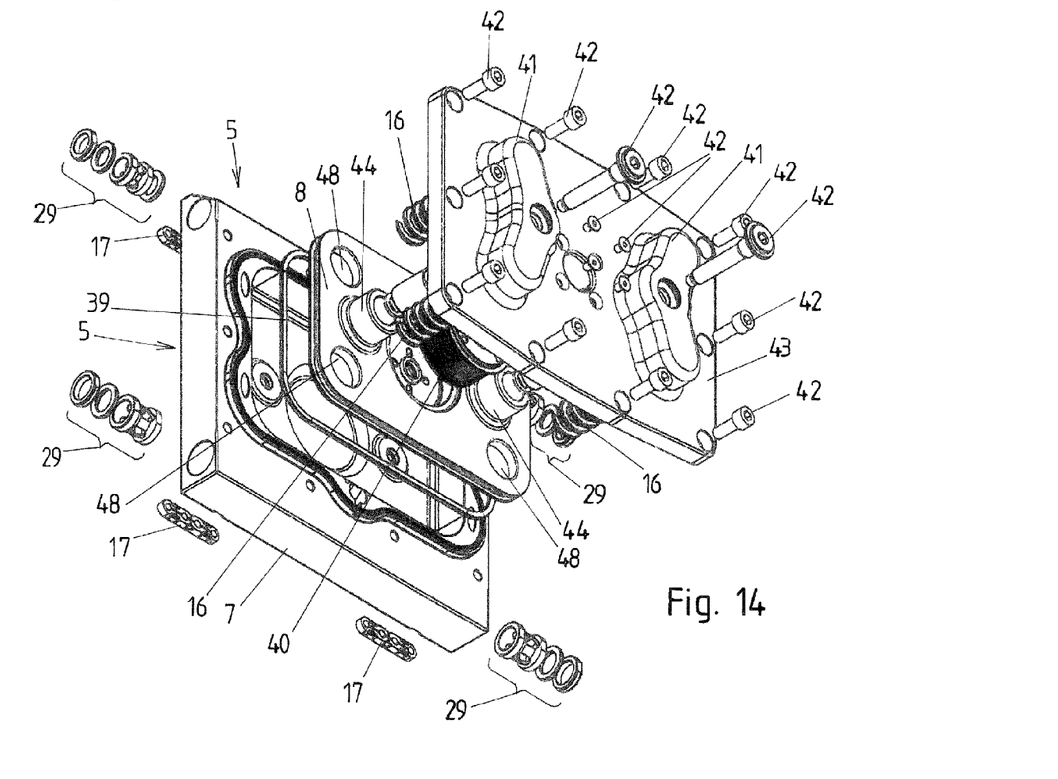
FIG. 14 shows an exploded illustration of a piston cylinder unit of the exemplary embodiment shown.

One of the piston cylinder units 5 is illustrated again in an exploded view in FIG. 14. The multi-part design of the sliding seals 29 can also be seen here. These are preferably formed in this case by a suitable sequence of supporting rings and ring seals. The various screws 42 by means of which the construction of the exemplary embodiment shown here is held together can also be seen. The blind holes 48 in the piston 8, in which the return springs 16 are mounted, can also be seen clearly.

The figures show an exemplary embodiment of the invention in which the pistons 8 of the piston cylinder units 4 and 5 are fixed in a stationary manner on the valve plate 2. The cylinders 7 of the piston cylinder units 5 are mounted displaceably on the supports 10 and 11. Lastly, it is noted that this can also be implemented differently however. It is thus quite conceivable to fix the cylinders 7 of all piston cylinder units 4 and 5 in a stationary manner on the valve plate 2 and to mount the respective pistons 8 of the piston cylinder units 5 movably, preferably displaceably, on at least one support 10 or 11. A gaseous or liquid medium or pressurized medium also does not necessarily have to be fed to and removed from the working chambers 14 and 15 of the respective piston cylinder units via the supports or the connection lines thereof. In addition, the piston cylinder units also do not necessarily have to be piston cylinder units each having two working chambers.

| Key to reference numerals: | |
|---|---|
| 1 | valve |
| 2 | valve plate |
| 3 | opening |
| 4 | piston cylinder unit |
| 5 | piston cylinder unit |
| 6 | valve seat |
| 7 | cylinder |
| 8 | piston |
| 9 | direction |
| 10 | support |
| 11 | support |
| 12 | connection line |
| 13 | connection line |
| 14 | working chamber |
| 15 | working chamber |
| 16 | return spring |
| 17 | countersupport member |
| 18 | counterseat |
| 19 | transverse drive |
| 20 | media connection |
| 21 | distributor block |
| 22 | valve housing |
| 23 | seal |
| 24 | pressure line |
| 25 | atmosphere line |
| 26 | linear guide |
| 27 | drive rod |
| 28 | drive support plate |
| 29 | sliding seal |
| 30 | slot |
| 31 | slot |
| 32 | venting connection line |
| 33 | pressure connection line |
| 34 | fixing pin |
| 35 | hole |
| 36 | hole |
| 37 | connection bore |
| 38 | connection bore |
| 39 | piston seal |
| 40 | bellows |
| 41 | curvature |
| 42 | fastening screws |
| 43 | cylinder cover |
| 44 | guide pin |
| 45 | transverse drive direction |
| 46 | closing direction |
| 47 | fixing seal |
| 48 | blind hole |

The invention claimed is:
1. A valve, comprising a valve plate for closing an opening, and at least two piston cylinder units that are adjacent to each other for pressing the valve plate against a valve seat; said valve seat surrounding the opening, at least one of the piston cylinder units having at least one cylinder as a component and at least one piston arranged displaceably in the cylinder as a further component, one of the components of the piston cylinder unit being fixed on the valve plate, and at least one of the components of the piston cylinder unit is mounted so as to be slidable on at least one support of the valve at least in a direction parallel to a spacing between the two adjacent piston cylinder units.

2. The valve as claimed in claim 1, wherein the valve is a vacuum valve.

3. The valve as claimed in claim 1, wherein the opening is in the valve.

4. The valve as claimed in claim 1, wherein the valve seat is part of the valve.

5. The valve as claimed in claim 1, wherein the one of the components of the piston cylinder unit that is fixed on the valve plate is fixed in a manner stationary relative to the valve plate.

6. The valve as claimed in claim 1, wherein at least one component of the other piston cylinder unit is mounted so as to be slidable on the at least one support of the valve at least in the direction parallel to the spacing between the two adjacent piston cylinder units.

7. The valve as claimed in claim 1, wherein the support includes at least some regions in the form of a tube or rod.

8. The valve as claimed in claim 1, wherein the at least one of the components of the piston cylinder unit is mounted on two or more supports so as to be movable at least in the direction parallel to the spacing between the two adjacent piston cylinder units.

9. The valve as claimed in claim 1, wherein at least one connection line for a gaseous or liquid medium is arranged in or on the at least one support, said connection line leading to a working chamber of the cylinder of at least one of the piston cylinder units.

10. The valve as claimed in claim 9, wherein the gaseous or liquid medium is a pressurized medium.

11. The valve as claimed in claim 1, wherein the cylinder of at least one of the piston cylinder units has two working chambers which are arranged on mutually opposed sides of the piston and can be filled with gaseous or liquid medium.

12. The valve as claimed in claim 11, wherein one of the working chambers is vented to atmosphere and the other working chamber is configured to be filled with gaseous or liquid pressurized medium in order to press the valve plate against the valve seat.

13. The valve as claimed in claim 12, wherein at least one return spring for lifting the valve plate from the valve seat is arranged in the working chamber vented with respect to the atmosphere.

14. The valve as claimed in claim 1, wherein the at least one support is fastened on at least one of the piston cylinder units and the respective component of at least one of the other piston cylinder units is mounted on the at least one support so as to be movable in the direction parallel to the spacing between the two adjacent piston cylinder units.

15. The valve as claimed in claim 14, wherein a working chamber of the other piston cylinder unit is configured to be supplied with or allow the release of a gaseous or liquid medium via the piston cylinder unit on which the at least one support is fastened and via the at least one support.

16. The valve as claimed in claim 1, wherein at least one countersupport member of the valve is arranged on the piston cylinder units and, when the valve plate is pressed against the valve seat by the piston cylinder units, is supported on a counterseat.

17. The valve as claimed in claim 1, wherein the spacing between adjacent piston cylinder units is changeable.

18. The valve as claimed in claim 1, wherein the at least one of the components of the piston cylinder unit that is mounted to be slidable is slidable relative to the other piston cylinder unit to provide for relative movement between the two adjacent piston cylinder units.

\* \* \* \* \*